United States Patent [19]

Okochi

[11] Patent Number: 5,737,465
[45] Date of Patent: Apr. 7, 1998

[54] MODULE FOR OPTICAL COMMUNICATION

[75] Inventor: Ken Okochi, Miyagi-ken, Japan

[73] Assignee: Alps Electric Co., Ltd., Tokyo, Japan

[21] Appl. No.: 722,595

[22] Filed: Sep. 27, 1996

[30] Foreign Application Priority Data

Oct. 4, 1995 [JP] Japan .................................. 7-257715

[51] Int. Cl.$^6$ .................................................. G02B 6/36
[52] U.S. Cl. ............................... 385/88; 385/90; 385/92
[58] Field of Search ................................... 385/88–94

[56] References Cited

U.S. PATENT DOCUMENTS 5,533,159 7/1996 Okochi et al. ............................ 385/93

FOREIGN PATENT DOCUMENTS 2-50110 2/1990 Japan .

*Primary Examiner*—Phan T. H. Palmer
*Attorney, Agent, or Firm*—Guy W. Shoup; Patrick T. Bever

[57] ABSTRACT

A module for optical communication which is capable of securely preventing reflection even if there are variations in the urging force of a ferrule and also of protecting an antireflection member from damage. A holding stopper for holding an antireflection member and also for positioning a ferrule is installed coaxially in a housing. A ferrule holding member for holding the ferrule is coaxially mounted on the holding stopper. When the ferrule is urged by a spring or other urging member and inserted in the ferrule holding member, the distal end of the ferrule first comes in contact with the apex of the antireflection member, causing the antireflection member to deform according to the distal end surface of the ferrule, then the distal end of the ferrule comes in contact with the reference surface of the holding stopper so that it is positioned and fixed in the direction of an optical axis.

6 Claims, 5 Drawing Sheets

MODULE FOR OPTICAL COMMUNICATION

BACKGROUND OF THE INVENTION

1. Field of the Invention

The present invention relates to a module for optical communication which provides optical connection between a light emitting element and an optical fiber and, more particularly, to a mechanism which prevents a distal end of the optical fiber or a ferrule from causing reflected light to go back to the light emitting element.

2. Description of the Related Art

FIG. 7 and FIG. 8 are block diagrams illustrative of a conventional module for optical communication which has been proposed in, for example, Japanese Unexamined Patent Publication No. 2-50110. In such a conventional module for optical communication, a light emitting element and a condenser lens are provided below an antireflection member 3 although they are not shown; the light emitted from the light emitting element is focused by the condenser lens. The antireflection member 3 prevents the reflected light from going back to the light emitting element and guides it to a fiber 6.

A housing 1 has an inserting hole through which a ferrule 5 supporting the fiber 6 is inserted from the direction of the arrow. Provided in the axial direction of the inserting hole are the antireflection member 3 having a curvature and a supporting member 2. The ferrule 5 is inserted while being urged by an urging member such as a spring, so that if the distal end of the ferrule 5 pushes and deforms the antireflection member 3, then the supporting member 2 holds and fixes the antireflection member 3 in place as illustrated in FIG. 8.

In the conventional module for optical communication, however, when the ferrule 5 is pressed and urged to be inserted in the hole, the variations in the urging force lead to variations in the pressure applied by the distal end of the ferrule 5 to the antireflection member 3. As a result, the positions of the ferrule 5 and the antireflection member 3 in the direction of the optical axis accordingly vary, causing misalignment between the focusing point of the light emitted from the light emitting element (not shown) and the end surface of the fiber 6. This presents a problem in that the quantity of light guided to the fiber 6 varies and that the reflection cannot be prevented. There is another problem in that, if the ferrule 5 provides an excessively large urging force, then the antireflection member 3 is damaged.

SUMMARY OF THE INVENTION

The present invention has been made with a view toward solving the problems with the prior art, and it is an object of the present invention to provide a module for optical communication which is capable of securely preventing reflection even if there are variations in the urging force of a ferrule and also of protecting an antireflection member from damage.

To this end, according to the present invention, there is provided a module for optical communication which is equipped with: a stopper having a reference surface which is in contact with a distal end of a ferrule supporting an optical fiber; and an antireflection member which prevents the light emitted from a light emitting element from being reflected by the distal end of the ferrule; wherein a central part of the antireflection member projects beyond the aforesaid reference surface when the ferrule has not yet been attached, while the central part of the antireflection member is pressed and deformed by the distal end of the ferrule when the ferrule is urged and the distal end thereof is in contact with the reference surface.

The module described above further has a holding member which is equipped with a shoulder for retaining the antireflection member so as to pressure-attach the peripheral edge of the antireflection member to the shoulder. The antireflection member is provided with an air venting hole. As an alternative, the antireflection member is composed of a resin material which has an elastic central part and a peripheral edge which is thicker than the central part; the peripheral edge thereof is locked in the aforesaid stopper.

With the arrangement described above, since the central part of the antireflection member is pressed and deformed by the distal end of the ferrule when the ferrule has been urged and the distal end thereof is in contact with the reference surface of the stopper, the positions of the ferrule and the antireflection member in the direction of the optical axis stay unchanged regardless of the urging force of the ferrule. Hence, even if the urging force of the ferrule varies, the reflection can be securely prevented and also the antireflection member can be protected from damage. Further, when the peripheral edge of the antireflection member is pressure-attached to the shoulder, the antireflection member can be fixed without using an adhesive agent, thus preventing any adhesive agent from oozing out of the peripheral edge of the antireflection member. Moreover, when the antireflection member is provided with the air venting hole, the failure of the reflection prevention caused by air can be prevented even if a foreign matter such as refuse is present between the antireflection member and the ferrule. Likewise, when the antireflection member is provided with the peripheral edge which engages with the stopper, the antireflection member can be mass-produced inexpensively using resin.

DESCRIPTION OF THE PREFERRED EMBODIMENT

Figure 1:
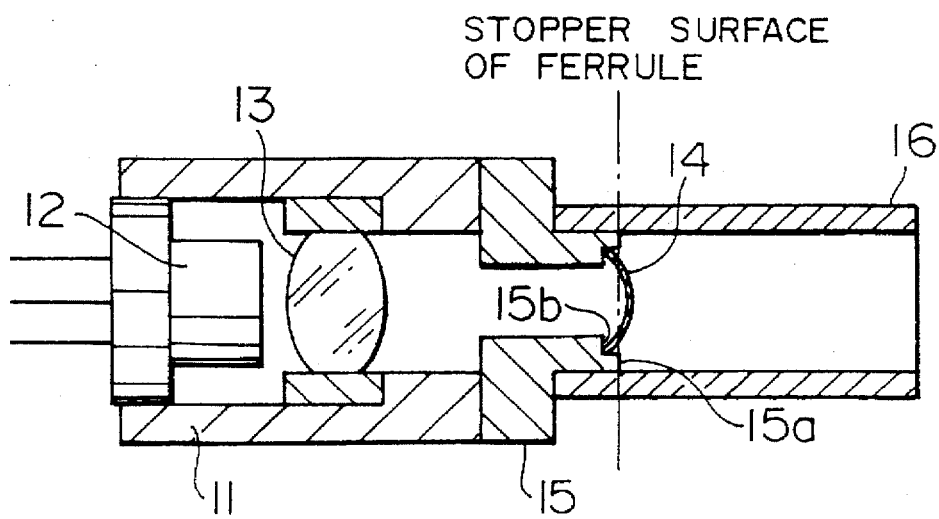
FIG. 1 is a block diagram illustrative of a module for optical communication according to an embodiment of the present invention.

Referring to the accompanying drawings, embodiments of the present invention will now be described. FIG. 1 is a block diagram showing an embodiment of a module for optical communication in accordance with the present invention; and FIG. 2 is a block diagram showing an essential part of the module for optical communication shown in FIG. 1 when a ferrule has been installed.

In FIG. 1, a light emitting element 12 and a condenser lens 13 are installed along the optical axis in a housing 11. Further, a holding stopper 15 for holding an antireflection member 14 and also for positioning a ferrule 17 (see FIG. 2) is installed coaxially in the housing 11; and a ferrule holding member 16 for holding the ferrule 17 is coaxially mounted on the holding stopper 15. These housing 11, holding stopper 15, and the ferrule holding member 16 are so configured that they form a hollow cylinder inside.

The distal end of the holding stopper 15 on the ferrule holding member 16 side is provided with an annularly formed reference surface 15a with which the distal end of the ferrule 17 comes in contact for positioning. The inside of the distal end of the holding stopper 15 is provided with an annularly formed shoulder 15b which engages with the antireflection member 14 to lock it. The antireflection member 14 is formed like a circle having a curvature; it is installed so that the central apex thereof projects beyond the reference surface 15a when the peripheral edge thereof is fitted to the shoulder 15b. The holding stopper 15 and the ferrule holding member 16 may alternatively be formed integrally into one piece.

Figure 2:
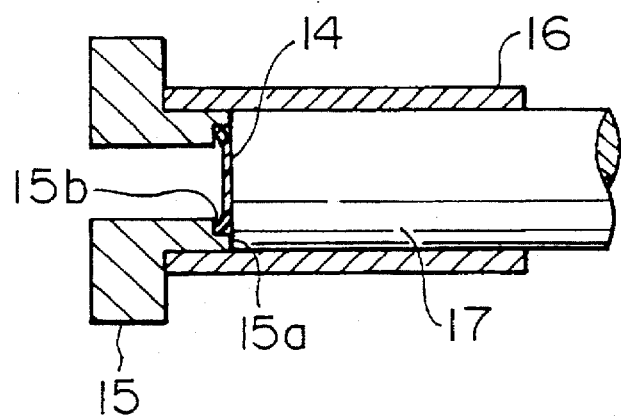
FIG. 2 is a block diagram illustrative of an essential part of the module for optical communication shown in FIG. 1 when a ferrule has been installed.

In the configuration described above, when the ferrule 17 is urged by a spring or other urging member and inserted in the ferrule holding member 16 as shown in FIG. 2, the distal end of the ferrule 17 first comes in contact with the apex of the antireflection member 14, causing the antireflection member 14 to deform according to the distal end surface of the ferrule 17, then the distal end of the ferrule 17 comes in contact with the reference surface 15a of the holding stopper 15 so that it is positioned and fixed in the direction of the optical axis.

Hence, according to the embodiment described above, since the distal end of the ferrule 17 comes in contact with the reference surface 15a of the holding stopper 15 so as to be positioned and fixed in the direction of the optical axis, the positions of the ferrule 17 and the antireflection member 14 in the direction of the optical axis stay unchanged even if there are variations in the urging force of the ferrule 17. This makes it possible to securely prevent reflection and to protect the antireflection member 14 from damage.

Figure 3A:
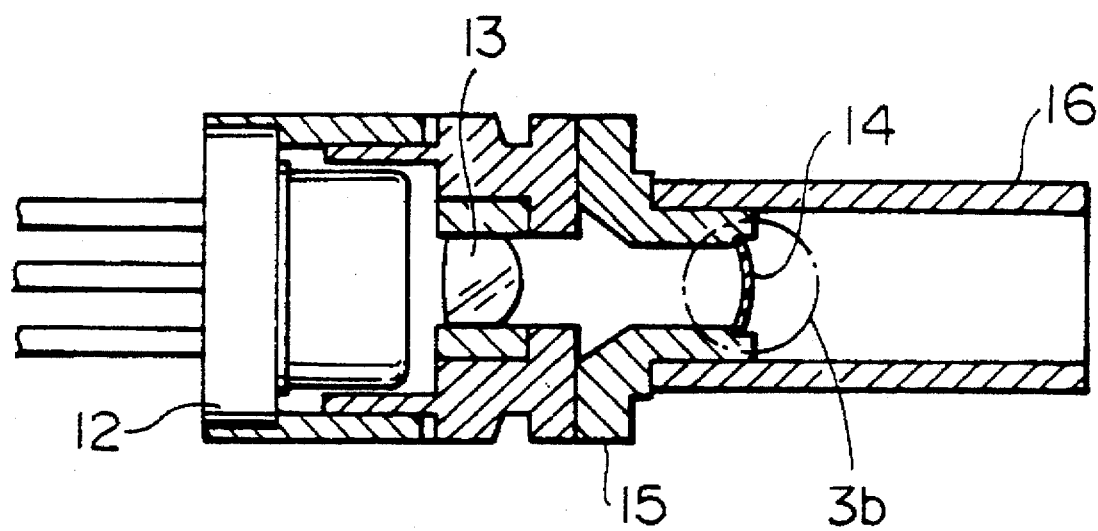
FIG. 3A is a block diagram illustrative of a modification of the module for optical communication shown in FIG. 1
Figure 3B:
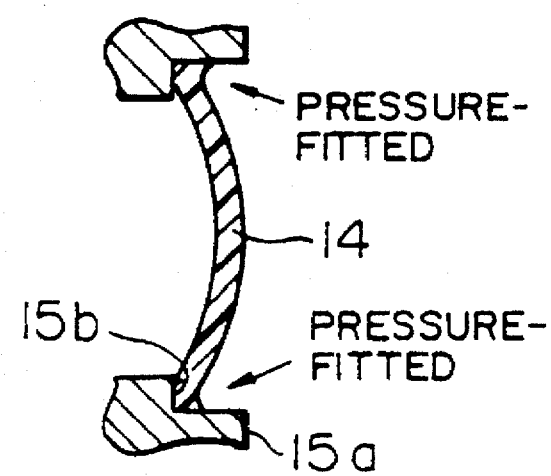
FIG. 3B is an enlarged view of a section indicated in FIG. 3A.

Referring now to FIG. 3, a modification will be described. In the embodiment described above, when the antireflection member 14 is formed to have a curvature in a normal state, it is generally fixed onto the shoulder 16b by gluing the peripheral edge thereof to the shoulder 16b with an adhesive agent. This assembling method, however, is disadvantageous in that the adhesive agent oozes out of the peripheral edge of the antireflection member 14 or the antireflection member 14 tilts with respect to the optical axis, making the installation difficult. The assembling method is also disadvantageous in that it adds to cost because the diameter of the antireflection member 14 must be matched to the shoulder 16b.

To overcome the disadvantages mentioned above, in this modification, the diameter of the antireflection member 14 is made slightly larger than the shoulder 15b and the peripheral edge of the antireflection member 14 is pressure-attached to the shoulder 16b by using a jig which is not shown; and the central part of the antireflection member 14 is formed to have a curvature so that it projects beyond the stopper surface 15a. The peripheral edge of the antireflection member 14 can be pressure-attached by pressure, heat, ultrasonic, etc.; in either way, no adhesive agent is used and therefore the problem mentioned above will be solved. In this case, the peripheral edge of the antireflection member 14 may be provided with a plurality of notches to prevent the deformation which occurs when pressure-attaching the antireflection member 14 to the shoulder 15b.

Another modification will now be described in conjunction with FIG. 4. When the distal end of the ferrule 17 comes in contact with the apex of the antireflection member 14 so as to be positioned and fixed, the presence of a foreign matter such as refuse between the ferrule 17 and the antireflection member 14 causes air to stagnate around the foreign matter; and as the distal end of the ferrule 17 is pushed by the antireflection member 14, the air spreads wide between the ferrule 17 and the antireflection member 14 and the optical characteristic is changed, making it impossible to prevent the reflection.

Figure 4A:
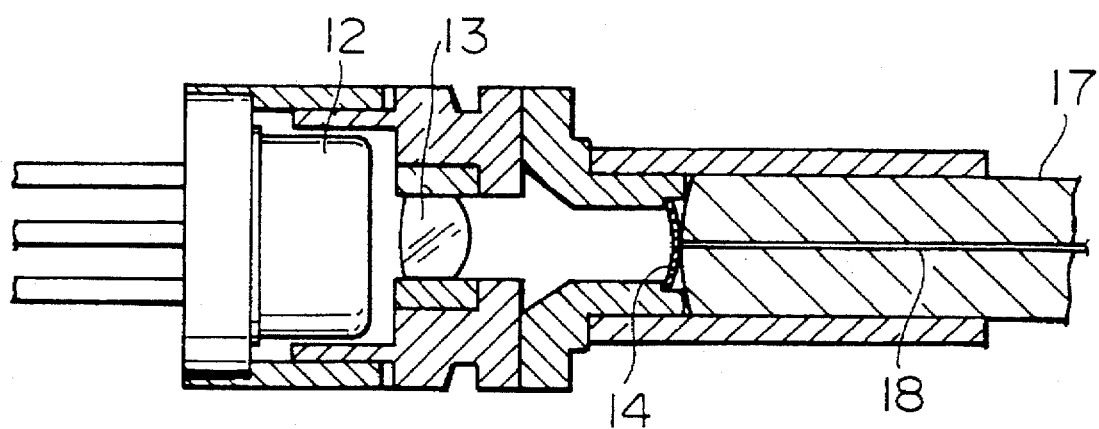
FIGS. 4a and 4b are block diagrams illustrative of another modification of the module for optical communication shown in FIG. 1.
Figure 4B:
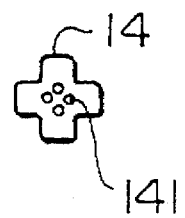

To prevent the problem mentioned above, in the modification shown in FIG. 4, the antireflection member 14 has an air venting hole 141 as shown in FIG. 4B, so that the air between the ferrule 17 and the antireflection member 14 is pushed out through the hole 141 as the ferrule 17 is pushed as illustrated in FIG. 4A. The hole 141 is preferably positioned around the apex of the antireflection member 14 which comes in contact with the fiber 18 located at the center of the ferrule 17 rather than positioned right on the apex.

FIG. 5 illustrates a second embodiment wherein the antireflection member 14 is replaced. When the configuration described above is employed for a receptacle type optical communication module, there are cases where a foreign matter such as refuse enters between the ferrule 17 and the antireflection member 14 and scratches the antireflection member 14 when attaching or detaching the ferrule 17. If the scratched antireflection member 14 is unreplaceable, then the whole expensive module becomes defective.

To overcome such a problem, in the second embodiment, the antireflection member 14 is so designed that it can be replaced by using a replacing jig 20 and a guiding member 22. The diameter of the replacing jig 20 is made equal to or smaller than that of the antireflection member 14; the distal end surface thereof is provided with a concave surface which is in contact with the peripheral edge of the antireflection member 14. The outside diameter of the guiding member 22 is made approximately equal to the outside diameter of the ferrule 17, i.e. the inside diameter of the ferrule holding member 16, and the inside diameter thereof is made approximately equal to the outside diameter of the replacing jig 20; the guiding member 22 serves as the guide for inserting the replacing jig 20.

Figure 5A:
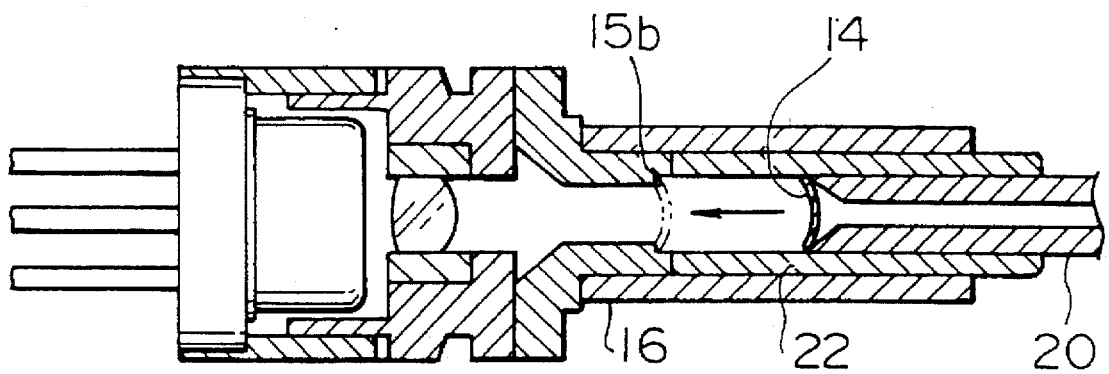
FIGS. 5a and 5b are block diagrams illustrative of a replacing jig for an antireflection member in a second embodiment of the present invention.
Figure 5B:
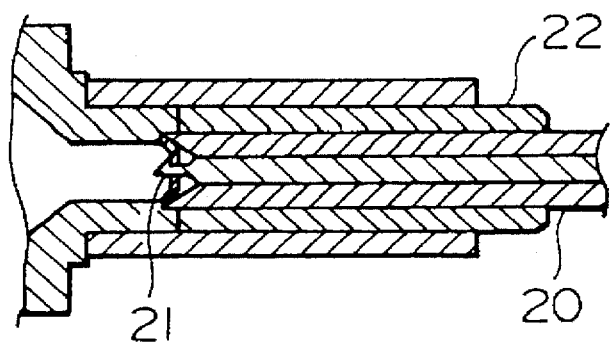

As shown in FIG. 5A, a new antireflection member 14 is installed by inserting the guiding member 22, in which the antireflection member 14 has been placed, into the ferrule holding member 16 and then by inserting the replacing jig 20 along the guiding member 22. In this case, the guiding member 22 serves also as a cartridge for housing and holding the antireflection member 14. To detach the antireflection member 14, as shown in FIG. 5B, a needle 21 for penetrating the antireflection member 14 is installed, passing through the center of the replacing jig 20, and the replacing jig 20 is inserted along the guiding member 22, then the needle 21 is penetrated through the antireflection member 14 and drawn out. This removes the antireflection member 14.

Figure 6:
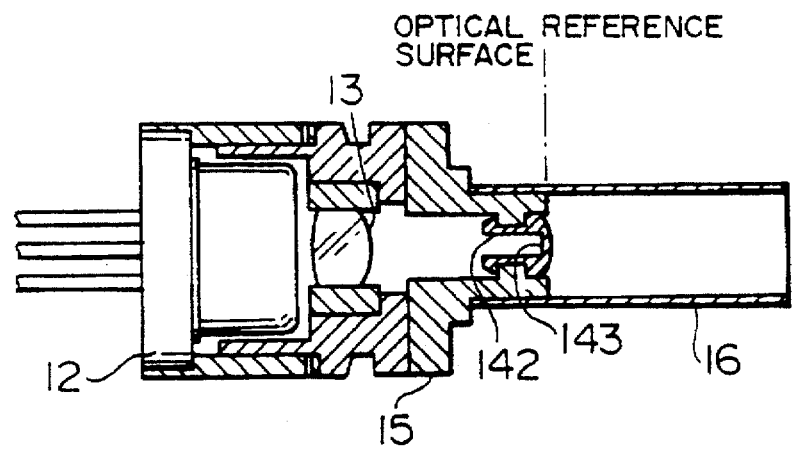
FIG. 6 is a block diagram illustrative of still another modification of the module for optical communication shown in FIG. 1.
Figure 7:
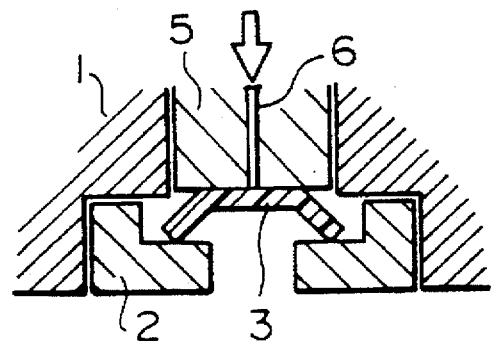
FIG. 7 is a block diagram illustrative of a conventional module for optical communication.
Figure 8:
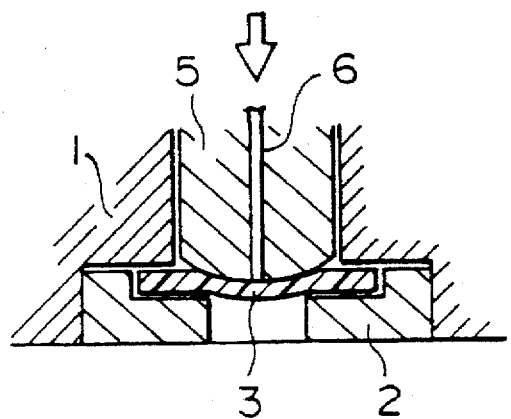
FIG. 8 is a block diagram illustrative of the module for optical communication shown in FIG. 7 when the ferrule has been installed.

Still another modification of the antireflection member 14 will now be described with reference to FIG. 6. In the embodiments illustrated in FIG. 1 through FIG. 5, the antireflection member 14 is approximately circular and has a uniform thickness, the peripheral edge thereof being engaged with the shoulder 16b; therefore, precise installation is required. According to the configuration shown in FIG. 6, a peripheral edge 142 is formed into a cylinder which can be engaged with the inside of the holding stopper 15 and a central part 143 has a curvature to make it elastic. With this arrangement, the antireflection member 14 can be installed simply by fitting the peripheral edge 142 in the holding stopper 15, thus eliminating the need for the precise installation and preventing the tilt with respect to the optical axis. Furthermore, a resin material which has approximately the same refractive index as that of the resin material used for the core of the optical fiber 18 can be used for the antireflection member 14, enabling the antireflection member to be mass-produced at low cost.

Thus, according to the present invention, since the central part of the antireflection member is pressed and deformed by the distal end of the ferrule when the ferrule has been urged and the distal end thereof is in contact with the reference surface of the stopper, the positions of the ferrule and the antireflection member in the direction of the optical axis stay unchanged regardless of the urging force of the ferrule. Hence, even if the urging force of the ferrule varies, the reflection can be securely prevented and also the antireflection member can be protected from damage. Further, when the peripheral edge of the antireflection member is pressure-attached to the shoulder, the antireflection member can be fixed without using an adhesive agent, thus preventing any adhesive agent from oozing out of the peripheral edge of the antireflection member. Moreover, when the antireflection member is provided with the air venting hole, the failure of the reflection prevention caused by air can be prevented even if a foreign matter such as refuse is present between the antireflection member and the ferrule. In addition, when the antireflection member is provided with the peripheral edge which engages with the stopper, the antireflection member can be mass-produced inexpensively by using resin.

What is claimed is:

1. A module for optical communication which provides optical connection between a light emitting element and a ferrule having a distal end, the module comprising:

a stopper having a reference surface surrounding an opening defined by a cylindrical wall; and an antireflection member having a peripheral edge which is in contact with the cylindrical wall;

wherein a central part of said antireflection member projects beyond said reference surface when said ferrule has not yet been attached to the module; and wherein the central part of said antireflection member is pushed and deformed by the distal end of said ferrule when the ferrule is in contact with said reference surface.

2. A module for optical communication according to claim 1, wherein said antireflection member is composed of a resin material which has an elastic central part and said peripheral edge which is thicker than the central part.

3. A module for optical communication according to claim 1, wherein said antireflection member is provided with an air venting hole.

4. A module for optical communication comprising:

a stopper having a reference surface for contacting a distal end of a ferrule supporting an optical fiber; and an antireflection member for preventing light emitted from a light emitting element from being reflected by the distal end of said ferrule;

wherein the stopper includes a shoulder for retaining said antireflection member such that a peripheral edge of said antireflection member is pressure-attached to the shoulder;

wherein a central part of said antireflection member projects beyond said reference surface when said ferrule has not yet been attached; and wherein the central part of said antireflection member is pushed and deformed by the distal end of said ferrule when the distal end of the ferrule is in contact with said reference surface.

5. A module for optical communication according to claim 4, wherein said antireflection member is provided with an air venting hole.

6. A module for optical communication according to claim 4, wherein said antireflection member is composed of a resin material which has an elastic central part and said peripheral edge which is thicker than the central part.

* * * * *